United States Patent
Lichtenegger

(10) Patent No.: US 9,683,632 B2
(45) Date of Patent: Jun. 20, 2017

(54) MULTISTAGE GEARBOX FOR MOTOR VEHICLES

(71) Applicant: AVL LIST GMBH, Graz (AT)

(72) Inventor: Stefan Lichtenegger, St. Stefan (AT)

(73) Assignee: AVL List GmbH, Graz (AU)

(*) Notice: Subject to any disclaimer, the term of this patent is extended or adjusted under 35 U.S.C. 154(b) by 0 days.

(21) Appl. No.: 14/441,023

(22) PCT Filed: Oct. 1, 2013

(86) PCT No.: PCT/EP2013/070428
§ 371 (c)(1),
(2) Date: May 6, 2015

(87) PCT Pub. No.: WO2014/072129
PCT Pub. Date: May 15, 2014

(65) Prior Publication Data
US 2015/0300456 A1    Oct. 22, 2015

(30) Foreign Application Priority Data
Nov. 8, 2012   (AT) ................ A 50502/2012

(51) Int. Cl.
*F16H 3/66*    (2006.01)
*F16H 3/72*    (2006.01)

(52) U.S. Cl.
CPC .............. *F16H 3/66* (2013.01); *F16H 3/666* (2013.01); *F16H 3/725* (2013.01);
(Continued)

(58) Field of Classification Search
CPC ............... F16H 3/66; F16H 2200/2043; F16H 2200/201; F16H 2200/0052
(Continued)

(56) References Cited

U.S. PATENT DOCUMENTS 6,623,398 B2   9/2003  Raghavan et al.
6,712,731 B1   3/2004  Raghavan et al.
(Continued)

FOREIGN PATENT DOCUMENTS

WO   2012084370   6/2012

*Primary Examiner* — Roger Pang
(74) *Attorney, Agent, or Firm* — Dykema Gossett PLLC

(57) ABSTRACT

The invention relates to a multistage gearbox for motor vehicles, having a plurality of forward gears and at least one reverse gear, consisting of a plurality of 3-shaft gearboxes and a plurality of shifting elements, with a driveshaft (W1), an output shaft (W2) and a plurality of gearbox shafts, differential shifts and sum shafts, wherein: a first differential shaft (d1.1) of a first 3-shaft gearbox (RS1) is connected for conjoint rotation to a first differential shaft (d1.2) of a second 3-shaft gearbox (RS2); the driveshaft (W1) and a sum shaft (s2) of the second 3-shaft gearbox (RS2) are connected for conjoint rotation; a fourth gearbox shaft (W6; W76) and a second differential shaft (d2.2) of the second 3-shaft gearbox (RS2) are connected for conjoint rotation; the fourth gearbox shaft (W6; W76) or a fifth gearbox shaft (W7) is connected for conjoint rotation to a first differential shaft (d1.3) of a third 3-shaft gearbox (RS3); and a third gearbox shaft (W5) and a second differential shaft (d2.1) of the first 3-shaft gearbox (RS1) are connected for conjoint rotation. A high functionality can be achieved by connecting a sum shaft (s1) of a first 3-shaft gearbox (RS1) for conjoint rotation to a sum shaft (s3) of the third 3-shaft gearbox (RS3), and by connecting the output shaft (W2) and a second differential shaft (d2.3) of the third 3-shaft gearbox (RS3) for conjoint rotation.

18 Claims, 5 Drawing Sheets

(52) U.S. Cl.
CPC ............. *F16H 2200/006* (2013.01); *F16H 2200/0043* (2013.01); *F16H 2200/0052* (2013.01); *F16H 2200/0086* (2013.01); *F16H 2200/201* (2013.01); *F16H 2200/2041* (2013.01); *F16H 2200/2043* (2013.01); *F16H 2200/2046* (2013.01)

(58) Field of Classification Search
USPC .................................................. 475/275–291
See application file for complete search history.

(56) References Cited

U.S. PATENT DOCUMENTS

| | | | |
|---|---|---|---|
| 7,059,995 B2 | 6/2006 | Stevenson | |
| 7,201,698 B2 | 4/2007 | Gumpoltsberger | |
| 7,988,588 B2 | 8/2011 | Phillips et al. | |
| 2007/0281822 A1* | 12/2007 | Maier | B25B 21/00 475/286 |
| 2008/0020889 A1* | 1/2008 | Jang | F16H 3/663 475/275 |
| 2008/0234093 A1* | 9/2008 | Diosi | F16H 3/66 475/276 |
| 2008/0261762 A1* | 10/2008 | Phillips | F16H 3/66 475/276 |
| 2016/0230847 A1* | 8/2016 | Cho | F16H 3/66 |

\* cited by examiner

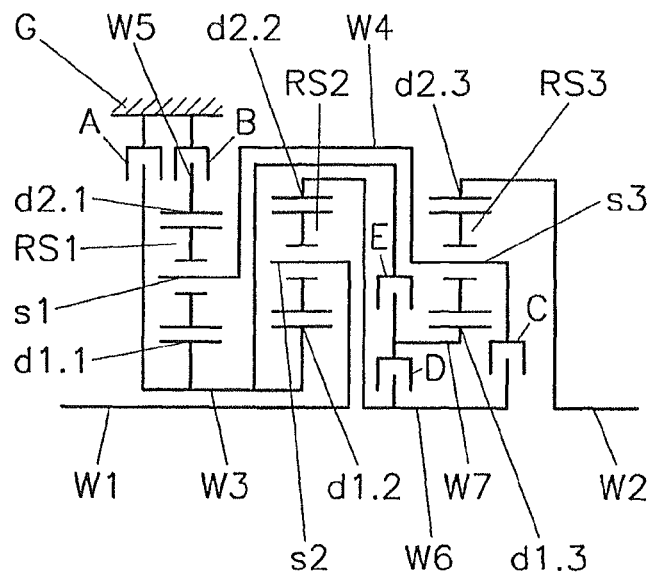
Fig.1
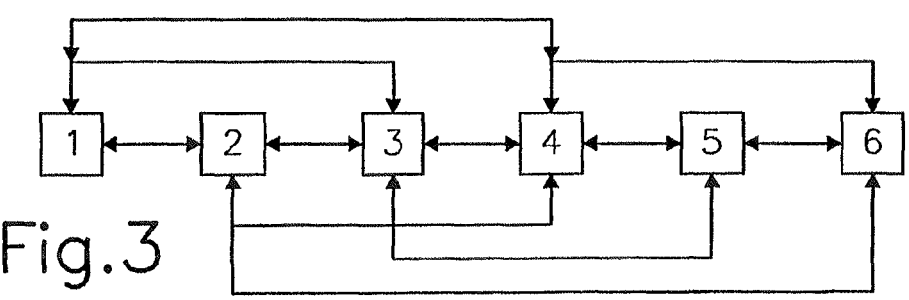
Fig.2
Fig.3

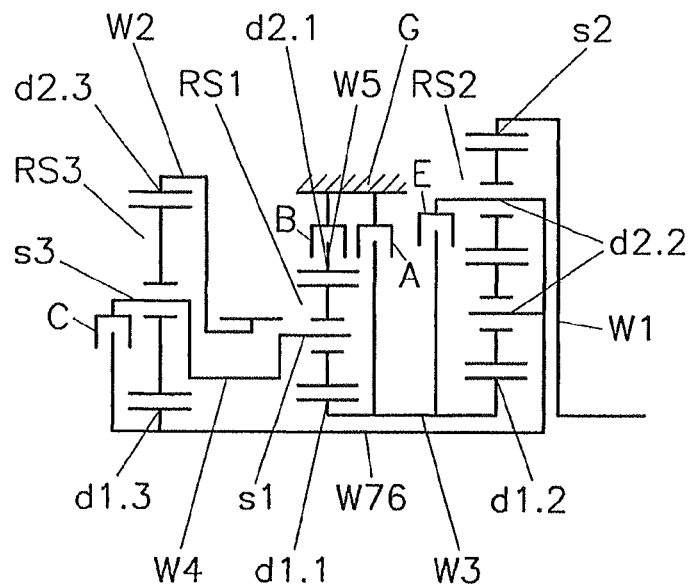
Fig.4
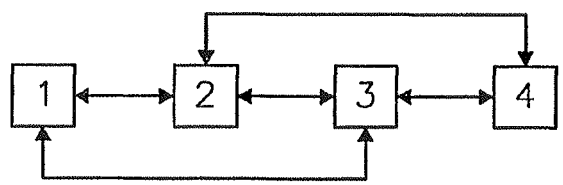
Fig.5
Fig.6

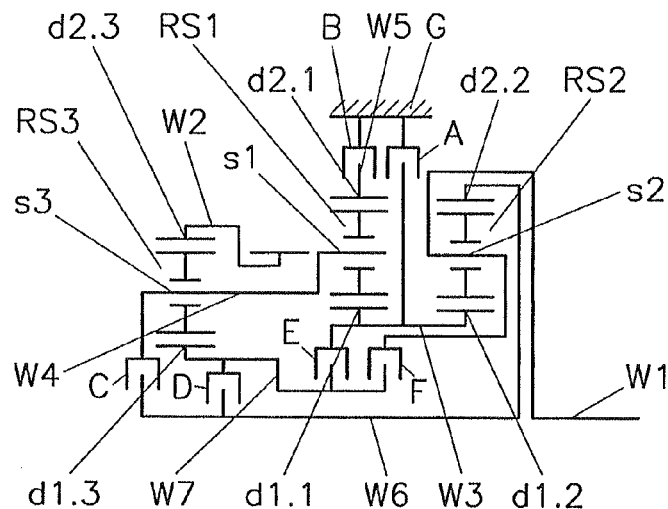
Fig.7
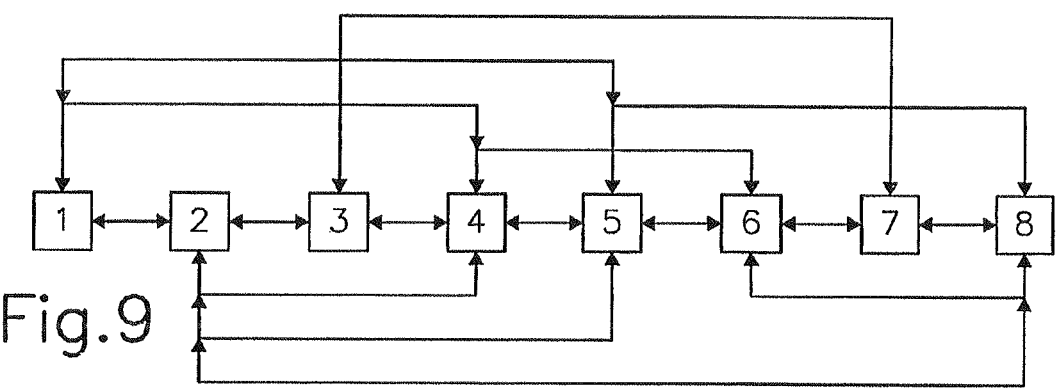
Fig.8
Fig.9

|    | A | B | C | D | E | F |
|----|---|---|---|---|---|---|
| R2 | x | x |   | x |   |   |
| R1 | x | x |   |   |   | x |
| N  |   | x |   |   |   |   |
| 1  |   | x |   | x | x |   |
| 2  |   | x | x |   | x |   |
| 3  |   | x | x |   |   | x |
| 4  |   | x | x | x |   |   |
| 5  |   |   | x | x |   | x |
| 6  | x |   | x | x |   |   |
| 7  | x |   | x |   |   | x |
| 8  | x |   | x |   | x |   |
Fig.10
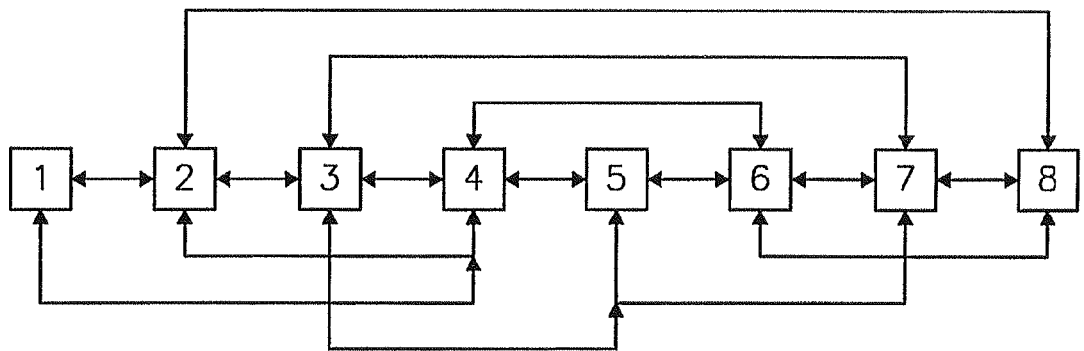
Fig.11
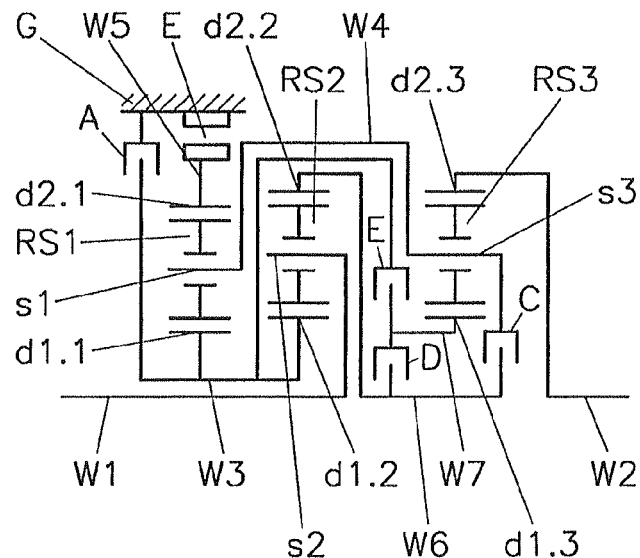
Fig.12

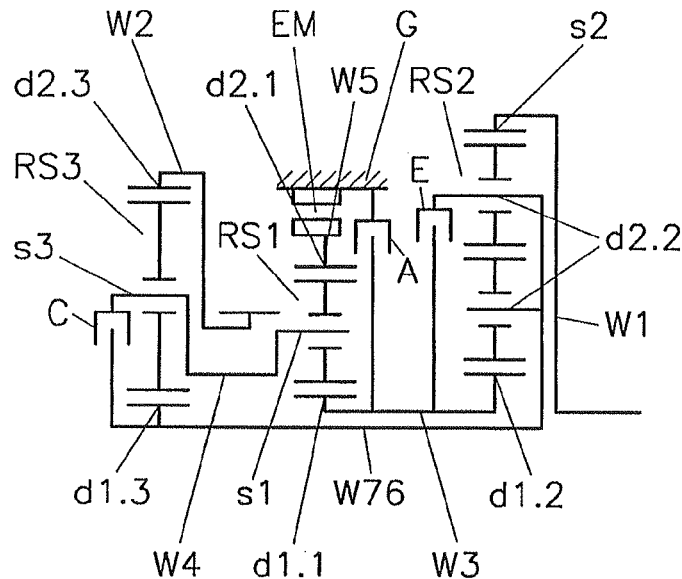
Fig.13
| | A | C | E | ICE | E-M |
|---|---|---|---|---|---|
| e-R | x | | | + | +/− |
| N | | | | 0 | 0 |
| e-1 | | | x | + | +/− |
| e-2 | | x | | + | +/− |
| 3 | | x | x | 0/+ | 0/+/− |
| 4 | x | x | | 0/+ | 0/+/− |
Fig.14
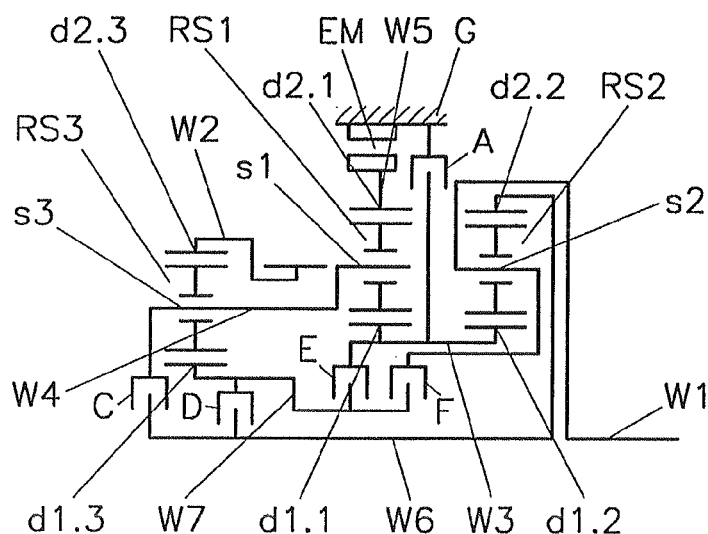
Fig.15

MULTISTAGE GEARBOX FOR MOTOR VEHICLES

BACKGROUND OF THE INVENTION

Field of the Invention

The invention relates to a multistage gearbox for motor vehicles with a plurality of forward gears and at least one reverse gear, comprising a plurality of 3-shaft gearboxes and a plurality of shifting elements, with a drive shaft, an output shaft and a plurality of gearbox shafts, differential shafts and sum shafts, wherein a first differential shaft of a first 3-shaft gearbox is connected for conjoint rotation, via a first gearbox shaft, to a first differential shaft of a second 3-shaft gearbox; the drive shaft and a sum shaft of a second 3-shaft gearbox are connected for conjoint rotation; a fourth gearbox shaft and a second differential shaft of a second 3-shaft gearbox are connected for conjoint rotation; the fourth gearbox shaft or a fifth gearbox shaft is connected for conjoint rotation to a first differential shaft of a third 3-shaft gearbox; and a third gearbox shaft and a second differential shaft of the first 3-shaft gearbox are connected for conjoint rotation.

The Prior Art

Multistage gearboxes of this kind with a plurality of forward gears and at least one reverse gear are commonly used in motor vehicles.

WO 2012/084 370 A1 discloses a multistage gearbox based on planetary gear trains of the kind described above, with a housing holding three planet sets and a plurality of shafts. By means of selected actuation of shifting elements configured as brakes and clutches diverse gear ratios between a drive shaft and an output shaft may be achieved.

It is an object of the present invention to provide a gearbox as described above with high functionality while economizing on space and cost.

SUMMARY OF THE INVENTION

According to the invention this object is achieved by proposing that a sum shaft of a first 3-shaft gearbox is connected for conjoint rotation, preferably via a second gearbox shaft, to a sum shaft of a third 3-shaft gearbox, and that the output shaft and a second differential shaft of a third 3-shaft gearbox are connected for conjoint rotation.

The 3-shaft gearboxes are to be understood here in particular as planetary gear trains. Regardless of the particular design, a 3-shaft gearbox always comprises two shafts having the same sign of the shaft torque and one shaft having the opposite sign. The shafts with the same sign are called differential shafts, the shaft with opposite sign is called sum shaft. A shaft which only transmits coupling power, is called carrier shaft, while shafts transmitting coupling power as well as rolling power are called central shafts.

Torque and speed behaviour of the differential and sum shafts of a 3-shaft gearbox are uniquely determined. For the kinematic description of a 3-shaft gearbox the concept of a fixed carrier train ratio is helpful. Fixed carrier train ratio is defined as the ratio between the two central shafts when the carrier shaft is standing still. The fixed carrier train ratio may be positive or negative, thereby defining a plus-gearbox and a minus-gearbox.

A minus-gearbox is a 3-shaft gearbox where the two central shafts act as differential shafts, while the carrier shaft acts as sum shaft.

A plus-gearbox is a 3-shaft gearbox where the carrier shaft and one of the two central shafts act as differential shafts, while the other central shaft acts as sum shaft.

In a simple planetary gear set with only one planet gear meshing on the one hand with the sun gear and on the other hand with the ring gear, the two central shafts of sun gear and ring gear are the differential shafts, the carrier shaft is the sum shaft. This kind of planetary gear set has the kinematics of a minus-gearbox.

In the case of a planetary gear set with one pair of planet gears, or a plurality of such pairs, where each of the first planet gears meshes with the sun gear and the second planet gear, while the second planet gear meshes with the ring gear and the first planet gear, the carrier shaft and the sun gear as first central shaft act as differential shafts, and the ring gear as second central shaft acts as sum shaft. This kind of planetary gear set has the kinematics of a plus-gearbox.

In the present case either all or some, at least two, of the 3-shaft gearboxes may be minus-gearboxes—for instance simple spur-gear planetary gearboxes with one planet gear, or plus-gearboxes—for instance simple spur-gear planetary gearboxes with at least one pair of planet gears.

At least one of the 3-shaft gearboxes—preferably the second 3-shaft gearbox—may be a plus-gearbox, preferably with two groups of mutually meshing planet gears.

The first differential shaft of the first 3-shaft gearbox and the first differential shaft of the second 3-shaft gearbox may be prevented from turning by means of a first shifting element—preferably configured as a brake.

Furthermore, in a simple variant, the second differential shaft of the first 3-shaft gearbox may also be prevented from turning by means of a second shifting element—preferably configured as a brake. Otherwise it may also be provided that the second differential shaft of the first 3-shaft gearbox is rotation-connected to an electric device.

The second differential shaft of the second 3-shaft gearbox can advantageously be rotation-connected via a third shifting element—preferably a clutch—to the sum shaft of the third 3-shaft gearbox.

A fourth shifting element, preferably configured as a clutch, may be provided between the second differential shaft of the second 3-shaft gearbox and the first differential shaft of the third 3-shaft gearbox.

In a further variant the first differential shaft of the first 3-shaft gearbox and the first differential shaft of the second 3-shaft gearbox may be rotation-connected via a fifth shifting element—preferably a clutch—to the first differential shaft of the third 3-shaft gearbox. As an alternative, the invention also may provide that the first differential shaft of the first 3-shaft gearbox and the first differential shaft of the second 3-shaft gearbox are rotation-connected via a fifth shifting element—preferably a clutch—to the second differential shaft of the second 3-shaft gear box.

Particularly high flexibility in the choice of gear ratios may be achieved if the sum shaft of the second 3-shaft gearbox can be rotation-connected via a sixth shifting element—preferably a clutch—to the first differential shaft of the third 3-shaft gearbox.

Some or all of the shifting elements may be friction-locking or positive-locking shifting elements such as multi-disc clutches or multi-disc brakes or dog clutches. If one or more positive-locking elements are chosen, each of these or only selected ones may be provided with a synchronizing device, or a central, mechanical or electrical synchronizing device may be provided in the gearbox.

The 3-shaft gearboxes are thus disposed in such a way that seven or six rotating gearbox shafts will result altogether, including drive shaft and output shaft. The first differential shaft of the first 3-shaft gearbox is connected via a first gearbox shaft for conjoint rotation to the first differential shaft of the second 3-shaft gearbox. The sum shaft of the first 3-shaft gearbox is connected via the second gearbox shaft for conjoint rotation to the sum shaft of the third 3-shaft gearbox. The drive shaft and the sum shaft of the second 3-shaft gearbox are connected for conjoint rotation. The output shaft and the second differential shaft of the third 3-shaft gearbox also are connected for conjoint rotation. The third gearbox shaft and the second differential shaft of the first 3-shaft gearbox are connected for conjoint rotation, as are the fourth gearbox shaft and the second differential shaft of the second 3-shaft gearbox. The fifth gearbox shaft is connected for conjoint rotation to the first differential shaft of the third 3-shaft gearbox.

The shifting elements are disposed in such a way that for each selectable gear three or two shifting elements must be active simultaneously to obtain controlled movement in the gearbox, the first gearbox shaft being coupled via the first shifting element—configured as a brake—to the static housing, the third gearbox shaft being coupled via a second shifting element—configured as a brake—to the static housing, the second gearbox shaft being coupled via a third shifting element—configured as a shaft coupling—to the fourth gearbox shaft, the fourth gearbox shaft being coupled via a fourth shifting element—configured as a shaft coupling—to the fifth gearbox shaft, and the first gearbox shaft being coupled via a fifth shifting element—configured as a shaft coupling—to the fifth gearbox shaft.

BRIEF DESCRIPTION OF THE DRAWINGS

The invention will now be described in more detail with reference to the enclosed drawings. There is shown in FIG. 1 a multistage gearbox according to the invention in a first variant;

FIG. 2 a shifting matrix for said multistage gearbox;

FIG. 3 possible shifting sequences of the forward gears of said multistage gearbox;

FIG. 4 a multistage gearbox according to the invention in a second variant;

FIG. 5 a shifting matrix of this second variant of the multistage gearbox;

FIG. 6 possible shifting sequences of the forward gears of the multistage gearbox of FIG. 5;

FIG. 7 a multistage gearbox according to the invention in a third variant;

FIG. 8 a shifting matrix of this third variant of the multistage gearbox;

FIG. 9 possible shifting sequences of the forward gears of the multistage gearbox of FIG. 7;

FIG. 10 another possible shifting matrix of the multistage gearbox;

FIG. 11 possible shifting sequences of the forward gears using the shifting matrix of FIG. 10;

FIG. 12 a multistage gearbox according to the invention in a fourth variant;

FIG. 13 a multistage gearbox according to the invention in a fifth variant;

FIG. 14 a shifting matrix of the multistage gearbox of FIG. 13; and

FIG. 15 a multistage gearbox according to the invention in a sixth variant.

DETAILED DESCRIPTION OF THE DEPICTED EMBODIMENTS

The drawings of the individual variants show the mutual disposition of the gearbox elements—such as shafts, gears or shifting elements.

In the diverse variants of the invention parts with identical function are indicated by identical reference numbers.

FIGS. 1, 4, 7, 12, 13 and 15 show diverse multistage automatic transmissions for motor vehicles with a plurality of forward gears 1, 2, 3, 4, 5, 6, 7, 8, a neutral or free-wheel gear N, and one or two reverse gears R1, R2, each with a housing G, in which are disposed first, second and third 3-shaft gearboxes RS1, RS2, RS3 configured as planetary gear sets. Each multistage gearbox has a drive shaft W1 connecting to an internal combustion engine (not shown), and an output shaft W2 and further gearbox shafts W3, W4, W5, W6, W7 (FIG. 1, 7, 12, 15) or W76 (FIGS. 4, 13). Letters A, B, C, D, E, F refer to shifting elements by whose chosen actuation various transmission ratios between a drive shaft W1 and an output shaft W2 may be realized.

Subsequently the 3-shaft gearboxes RS1, RS2, RS3 will be described using the terms sum shaft and differential shaft. Some or all of the 3-shaft gearboxes used—RS1, RS2, RS3—may be simple planetary gear sets, which are configured as plus or minus gearboxes. Some or all of the shifting elements A, B, C, D, E, F may be friction-locking or positive-locking shifting elements, such as for instance multi-disc clutches or multi-disc brakes or dog clutches. In the case of one or more positive-locking shifting elements synchronizing devices may be provided individually for some or all of these elements, or a central, mechanical or electrical synchronizing device may be provided in the gearbox.

The 3-shaft gearboxes RS1, RS2, RS3 are disposed within the multistage gearbox in such a way that altogether seven (respectively six) rotatable shafts result, i.e. drive shaft W1, output shaft W2, gearbox shafts W3, W4, W5, W6, W7 (or W76 instead of W6 and W7), and that a first differential shaft d1.1 of a first 3-shaft gearbox RS1 connects to a first differential shaft d1.2 of a second 3-shaft gearbox RS2 via a first gearbox shaft W3, the sum shaft s1 of a first 3-shaft gearbox RS1 connects to the sum shaft s3 of a third 3-shaft gearbox RS3 via a second gearbox shaft W4, the drive shaft W1 connects to the sum shaft s2 of a second 3-shaft gearbox RS2, the output shaft W2 connects to a second differential shaft d2.3 of a third 3-shaft gearbox RS3, a third gearbox shaft W5 connects to a second differential shaft d2.1 of a first 3-shaft gearbox RS1, a fourth gearbox shaft W6 connects to a second differential shaft d2.2 of a second 3-shaft gearbox RS2, and a fifth gearbox shaft W7 connects to a first differential shaft d1.3 of a third 3-shaft gearbox RS3. All cited connections are to be understood as connections for conjoint rotation.

The shifting elements A, B, C, D, E (FIG. 2); A, B, C, D, E, F (FIGS. 8 and 10) are disposed such that in the variants of FIG. 1, FIG. 7, FIG. 12 and FIG. 15 for each shiftable gear R or R1, R2; 1, 2, 3, 4, 5, 6; 7, 8 always three (FIGS. 2, 8, 10) respectively two (FIGS. 5, 14) shifting elements must be simultaneously active to achieve controlled motion in the multistage gearbox. The first gearbox shaft W3 may be coupled to the static housing G by means of a first shifting element A configured as a brake, the third gearbox shaft W5 may be coupled to the static housing G by means of a second shifting element B configured as a brake, the second gearbox shaft W4 may be coupled to the fourth gearbox shaft W6 by means of a third shifting element C configured as a shaft coupling, the fourth gearbox shaft W6 may be coupled to the fifth gearbox shaft W7 by means of a fourth shifting element D configured as a shaft coupling, and the first gearbox shaft W3 may be coupled to the gearbox shaft W7 by means of a sixth shifting element E configured as a clutch.

FIG. 1 shows a first possible variant of such a multistage gearbox, in which the 3-shaft gearboxes RS1, RS2, RS3 are configured as simple spur-gear planetary gearboxes with one planet gear, i.e. as minus-gearboxes. The second 3-shaft gearbox RS2 is here located axially between the two other 3-shaft gearboxes RS1, RS3, the third 3-shaft gearbox RS3, which is connected to the output shaft W2, being placed on the output side. This results in an advantageous design of the multistage gearbox for a longitudinal arrangement.

FIG. 2 shows a shifting matrix displaying the positions of the individual shifting elements A, B, C, D, E for the gears R, N, 1, 2, 3, 4, 5, 6 of the variant shown in FIG. 1. There are realized six forward gears 1, 2, 3, 4, 5, 6 and one reverse gear R.

By the arrangement of FIG. 1 the following fixed carrier train ratios $i_{0RS1}$, $i_{0RS2}$, $i_{0RS3}$ of the 3-shaft gearboxes RS1, RS2, RS3 may for instance be realized:

| | |
|---|---|
| $i_{0RS1}$ | −1.654 |
| $i_{0RS2}$ | −3.920 |
| $i_{0RS3}$ | −4.750 |

Furthermore the following transmission ratios i and step jumps φ may be realized:

| | i | φ |
|---|---|---|
| 1 | 4.071 | 6.186 |
| 2 | 2.05 | 1.986 |
| 3 | 1.336 | 1.534 |
| 4 | 1 | 1.336 |
| 5 | 0.797 | 1.255 |
| 6 | 0.658 | 1.211 |
| R | −3.78 | |

FIG. 3 shows the possible shifting sequences of the forward gears 1, 2, 3, 4, 5, 6 of the variant shown in FIG. 1, which can be realized by simple deactivation of only one shifting element and activation of one other shifting element.

If the fourth shifting element D is omitted and the fourth and fifth gearbox shafts W6 and W7 are replaced by the gearbox shaft W76, there results an arrangement with three 3-shaft gearboxes RS1, RS2, RS3, four shifting elements A, B, C, E and six gearbox shafts 1, 2, 3, 4, 5, 76, as shown in FIG. 4. In the variant shown in FIG. 4 the first and third 3-shaft gearbox RS1 and RS3 are configured as simple spur-gear planetary gear trains with one planet gear, i.e. as minus-gearboxes, and the second 3-shaft gearbox is configured as a simple spur-gear planetary gear train with a pair of planet gears or with two groups of mutually meshing planet gears, i.e. as a plus-gearbox.

Due to the configuration as a plus-gearbox the sum shaft s2 is realized as the ring gear and as regards packaging can be advantageously connected to the drive shaft W1. Furthermore, as regards axial position, all shifting elements A, B, C, E are located radially external to the power transmitting shafts and may be accessed advantageously from the outside.

FIG. 5 presents a shifting matrix describing the positions of the individual shifting elements A, B, C, E for gears R, N, 1, 2, 3, 4 of the variant shown in FIG. 4. There are four forward gears 1, 2, 3, 4 and one reverse R.

FIG. 6 shows the possible shifting sequences of the forward gears 1, 2, 3, 4 of the variant of FIG. 4, which can be realized by deactivating only a single shifting element and activating one other shifting element.

If the variant described in FIG. 1 is extended by a sixth shifting element F, by means of which the drive shaft W1 can be coupled to the fifth gear shaft W7 for conjoint rotation, there results an arrangement with three 3-shaft gearboxes RS1, RS2, RS3, six shifting elements A, B, C, D, E, F and seven shafts W1, W2, W3, W4, W5, W6, W7 in the multistage gearbox, as shown in FIG. 7. In the variant shown in FIG. 7 the 3-shaft gear boxes RS1, RS2, RS3 are configured as simple spur-gear planetary gear trains with one planet gear or one planet gear group, i.e. as minus-gearboxes.

FIG. 8 presents a shifting matrix describing the positions of the individual shifting elements A, B, C, E, F for the individual gears of the variant shown in FIG. 7. There are eight forward gears 1, 2, 3, 4, 5, 6, 7, 8 and two reverse gears R1, R2.

FIG. 9 shows the possible shifting sequences of the forward gears of the shifting matrix shown in FIG. 8, which can be realized by deactivating only a single shifting element and activating one other shifting element.

FIG. 10 shows a further possible shifting matrix describing the positions of the individual shifting elements A, B, C, D, E, F for the individual gears of the multistage gearbox of FIG. 7. There will also result eight forward gears 1, 2, 3, 4, 5, 6, 7, 8 and two reverse gears R1, R2.

FIG. 11 shows the possible shifting sequences of the forward gears of the shifting matrix shown in FIG. 10, which can be realized by deactivating only a single shifting element and activating one other shifting element.

Replacing one of the shifting elements A, B—for instance shifting element B—in the variants shown in FIGS. 1, 4 and 7 by an electric motor EM will result in further arrangements with a plurality of power-differentiated driving regimes and diverse selectable gears. It will thus be possible to compensate large jumps between gears in a continuous electrodynamical way, which will certainly improve the comfort of driving. Preferably, a shifting element configured as a brake—in particular the shifting element B—is replaced by an electric motor EM.

FIG. 12 shows a variant based on the multistage gearbox of FIG. 1, in which the shifting element B is replaced by an electric motor EM.

FIG. 13 shows a variant based on the multistage gearbox of FIG. 4, in which the shifting element B is replaced by an electric motor EM.

FIG. 14 shows a shifting matrix describing the positions of the individual shifting elements A, C, E, the possible drive states ICE of the internal combustion engine and E-M of the electric motor EM for the arrangement shown in FIG. 13. There result three continuously power-differentiated driving regimes e-R, e-1, e-2, two for forward driving e-1, e-2, one for driving in reverse e-R, and two forward gears 3, 4.

FIG. 15 shows a variant based on the multistage gearbox of FIG. 7, in which the shifting element B is replaced by an electric motor EM.

The invention claimed is:
1. A multistage gearbox for motor vehicles with a plurality of forward gears and at least one reverse gear, comprising a plurality of 3-shaft gearboxes and a plurality of shifting elements, with a drive shaft, an output shaft and a plurality of gearbox shafts, differential shafts and sum shafts, wherein a first differential shaft of a first 3-shaft gearbox is connected for conjoint rotation, via a first gearbox shaft, to a first differential shaft of a second 3-shaft gearbox; the drive shaft and a sum shaft of the second 3-shaft gearbox are connected for conjoint rotation; a fourth gearbox shaft and a second differential shaft of the second 3-shaft gearbox are connected for conjoint rotation; the fourth gearbox shaft or a fifth gearbox shaft is connected for conjoint rotation to a first differential shaft of a third 3-shaft gearbox; and a third gearbox shaft and a second differential shaft of the first 3-shaft gearbox are connected for conjoint rotation, wherein a sum shaft of the first 3-shaft gearbox is connected for conjoint rotation to a sum shaft of the third 3-shaft gearbox, the output shaft and a second differential shaft of the third 3-shaft gearbox are connected for conjoint rotation, and wherein the second differential shaft of the second 3-shaft gearbox may be rotation-connected to the sum shaft of the third 3-shaft gearbox by means of a third shifting element.

2. The multistage gearbox according to claim 1, wherein the second 3-shaft gearbox is configured as a plus-gearbox.

3. The multistage gearbox according to claim 1, wherein the first differential shaft of the first 3-shaft gearbox and the first differential shaft of the second 3-shaft gearbox may be prevented from turning by means of a first shifting element.

4. The multistage gearbox according to claim 1, wherein the second differential shaft of the first 3-shaft gearbox may be prevented from turning by means of a second shifting element.

5. The multistage gearbox according to claim 1, wherein the first or second differential shaft of the first 3-shaft gearbox may be rotation-connected to an electric motor.

6. The multistage gearbox according to claim 1, wherein the second differential shaft of the second 3-shaft gearbox may be rotation-connected to the first differential shaft of the third 3-shaft gearbox by means of a fourth shifting element.

7. The multistage gearbox according to claim 1, wherein the first differential shaft of the first 3-shaft gearbox and the first differential shaft of the second 3-shaft gearbox may be rotation-connected to the first differential shaft of the third 3-shaft gearbox by means of a fifth shifting element.

8. The multistage gearbox according to claim 1, wherein the first differential shaft of the first 3-shaft gearbox and the first differential shaft of the second 3-shaft gearbox may be rotation-connected to the second differential shaft of the second 3-shaft gearbox by means of a fifth shifting element.

9. The multistage gearbox according to claim 1, wherein the sum shaft of the second 3-shaft gearbox may be rotation-connected to the first differential shaft of the third 3-shaft gearbox by means of a sixth shifting element.

10. The multistage gearbox according to claim 1, wherein the sum shaft of the first 3-shaft gearbox is connected for conjoint rotation to the sum shaft of the third 3-shaft gearbox via a second gearbox shaft.

11. The multistage gearbox according to claim 2, wherein the plus-gearbox, comprises two groups of mutually meshing planet gears.

12. The multistage gearbox according to claim 3, wherein the first shifting element is configured as a brake.

13. The multistage gearbox according to claim 4, wherein the second shifting element is configured as a brake.

14. The multistage gearbox according to claim 1, wherein the third shifting element is configured as a shaft coupling.

15. The multistage gearbox according to claim 6, wherein the fourth shifting element is configured as a shaft coupling.

16. The multistage gearbox according to claim 7, wherein the fifth shifting element is configured as a shaft coupling.

17. The multistage gearbox according to claim 8, wherein the fifth shifting element is configured as a shaft coupling.

18. The multistage gearbox according to claim 9, wherein the sixth shifting element is configured as a shaft coupling.

* * * * *

UNITED STATES PATENT AND TRADEMARK OFFICE
CERTIFICATE OF CORRECTION

PATENT NO. : 9,683,632 B2
APPLICATION NO. : 14/441023
DATED : June 20, 2017
INVENTOR(S) : Lichtenegger et al.

Page 1 of 1

It is certified that error appears in the above-identified patent and that said Letters Patent is hereby corrected as shown below:

On the Title Page

(73) Assignee should read: --AVL List GmbH, Graz (AT)--

Signed and Sealed this
Eighth Day of August, 2017

Joseph Matal
*Performing the Functions and Duties of the*
*Under Secretary of Commerce for Intellectual Property and*
*Director of the United States Patent and Trademark Office*